INVENTOR.
LOREN J. O'BRIEN

ATTORNEY

INVENTOR.
LOREN J. O'BRIEN

ATTORNEY

United States Patent Office 3,605,523
Patented Sept. 20, 1971

3,605,523
TRANSFER CASE INCLUDING A TORQUE SPLITTING DIFFERENTIAL
Loren J. O'Brien, Fort Wayne, Ind., assignor to Dana Corporation, Toledo, Ohio
Filed Sept. 15, 1969, Ser. No. 857,972
Int. Cl. F16h *1/40*
U.S. Cl. 74—711          5 Claims

ABSTRACT OF THE DISCLOSURE

A chain drive transfer case for a full time four-wheel drive vehicle including an inter-axle differential comprised of a standard differential plus a torque-responsive clutch introduced between coaxial output shafts for driving the front and rear axles of the vehicle. The torque-responsive clutch is designed to divide the engine torque unequally at the output shafts in such proportion that at all times sufficient torque is applied to the rear axle and relatively lesser torque to the front axle. Cooperating positive and friction clutch means make up the torque responsive clutch which is operative through driving engagement with one of the side gears of the differential to cause the unbalance in the drive system.

BACKGROUND OF THE INVENTION

(1) Field of the invention

The invention relates to a transfer case for four-wheel drive vehicles and particularly to the introduction of an unequal torque dividing inter-axle differential in the transfer case between the front and rear driving axles for delivering a greater amount of torque to the axle where the load is more concentrated.

(2) Description of the prior art

In vehicles having motive power applied to both front and rear axles, the greater driving force, i.e., tractive effort, is necessary at the wheels of the axle supporting the greatest load. Since the rear axle generally supports substantially more than one-half the rated gross weight of a vehicle the torque supplied to the rear axle should be divided in this ratio of loading. Conventional differentials have long been utilized in four-wheel drive vehicles to divide the power flow of the vehicle between the front and rear axles but such differentials, although preventing any problem occurring with overriding of one axle relative to the other, supply an equal loading to each axle and accordingly under certain conditions results in windup, wheel fight, and tire scuffing.

Attempts have been made to provide for the splitting of torque unequally by using the inter-axle differentials wherein the bevel side gears are of differing diameters, making the planet pinions of different sizes or changing the pitch ratio of the pinions. Such provisions divide the driving torque between the front and rear axles in a manner more consistent with the actual gross weight loading to these axles.

Examples of such devices can be found in U.S. Pats. 2,768,538 to Simonds, 3,095,758 to Bixby and 3,420,121 to Stieg. The differential gearing in the Simonds patent is of the power proportioning or torque dividing type wherein one side gear is of larger diameter than the other and the differential pinions are on inclined axes. The side gear of larger diameter provides the larger torque and thus is connected to and drives the output shaft extending to the rear axle.

The differential gearing in the Bixby patent employs a planetary gear unit which is used to divide the torque unequally with the pitch ratio between the sun gear and ring gear being such that about 1/3 of the torque is delivered to the front axle and about 2/3 to the rear axle.

In the Stieg patent a spur gear differential divides the output torque unequally between the axles by utilization of sets of meshing pairs of spur type planet pinions of different sizes which form reducing gear trains between a pair of spaced side gears.

SUMMARY OF THE INVENTION

Every vehicle equipped with full time four-wheel drive provides that extra traction necessary when encountering rough terrain. With all four wheels driving, a vehicle handles better and is safer under all types of operating conditions.

A vehicle in motion encounters a variety of conditions which constantly change wheel speeds and loading. Since the four wheels of a vehicle travel at their own individual speeds while carrying different loads under these varying conditions a fight or windup is caused in a four-wheel drive system unless provision is made to balance these conditions.

Accordingly, it is an object of this invention to provide a transfer case for a vehicle of this type having an inter-axle differential which transmits drive to the front and rear axles in such a manner as to eliminate tire scuffing, wheel fight, and windup in such a system.

Another object of this invention is to provide an inter-axle differential which can be designed to accommodate any desired load balance between front and rear driving axles.

A further object of this invention is to provide a transfer case with an inter-axle differential having unequal torque flow to the front and rear axles of the vehicle.

In accordance with these objects, the present invention provides a transfer case assembly having an input shaft disposed in the upper portion of the case with a drive gear means fixedly rotating with the shaft and the axis of the input shaft being aligned with and driven by a power output shaft of a vehicle transmission. Disposed within the lower portion of the transfer case and aligned with the first gear means is a ring gear of a differential. Chain drive means interconnects the first mentioned gear means and the ring gear of the differential so as to provide a smooth flow of power therebetween.

The differential housing is supported on a pair of coaxial output shafts adapted to transmit drive to the front and rear axles of the vehicle. Within the differential housing, conventional pairs of side and pinion gears are rotatably mounted so as to be in mesh with each other with one side gear being splined directly to the output shaft normally disposed to drive the front axle while the other side gear cooperates with friction clutch means operatively associated with the other output shaft normally disposed to drive the rear axle of the vehicle. Positive means is provided between this side gear and the friction clutch means to impose an additional load on the friction clutch means so as to provide a greater amount of torque to be delivered to the rear axle than is being delivered to the front axle.

Torque flow from the first gear means to the ring gear and then to the output shafts of the respective side gears occurs in the following manner. Torques $T_1$ and $T_2$ are provided to the respective output shafts by their side gears with these torques being equal based on the fact that the diameters of the side gears are equal. Another torque $T_3$ also flows from the friction clutch means so that the output shaft associated with this friction clutch means and its respective side gear is of greater magnitude ($T_3$ plus $T_2$) than the torque ($T_2$) provided for the other output shaft by its respective side gear. Thus, a larger portion of input torque can be divided out within the differential and utilized to drive that axle, normally the rear axle, having the greater loading thereon.

BRIEF DESCRIPTION OF THE DRAWINGS

Further objects and advantages of this invention will become apparent upon reading the following specification taken together with the accompanying drawings which form a part thereof.

In the drawings.

Figure 1:
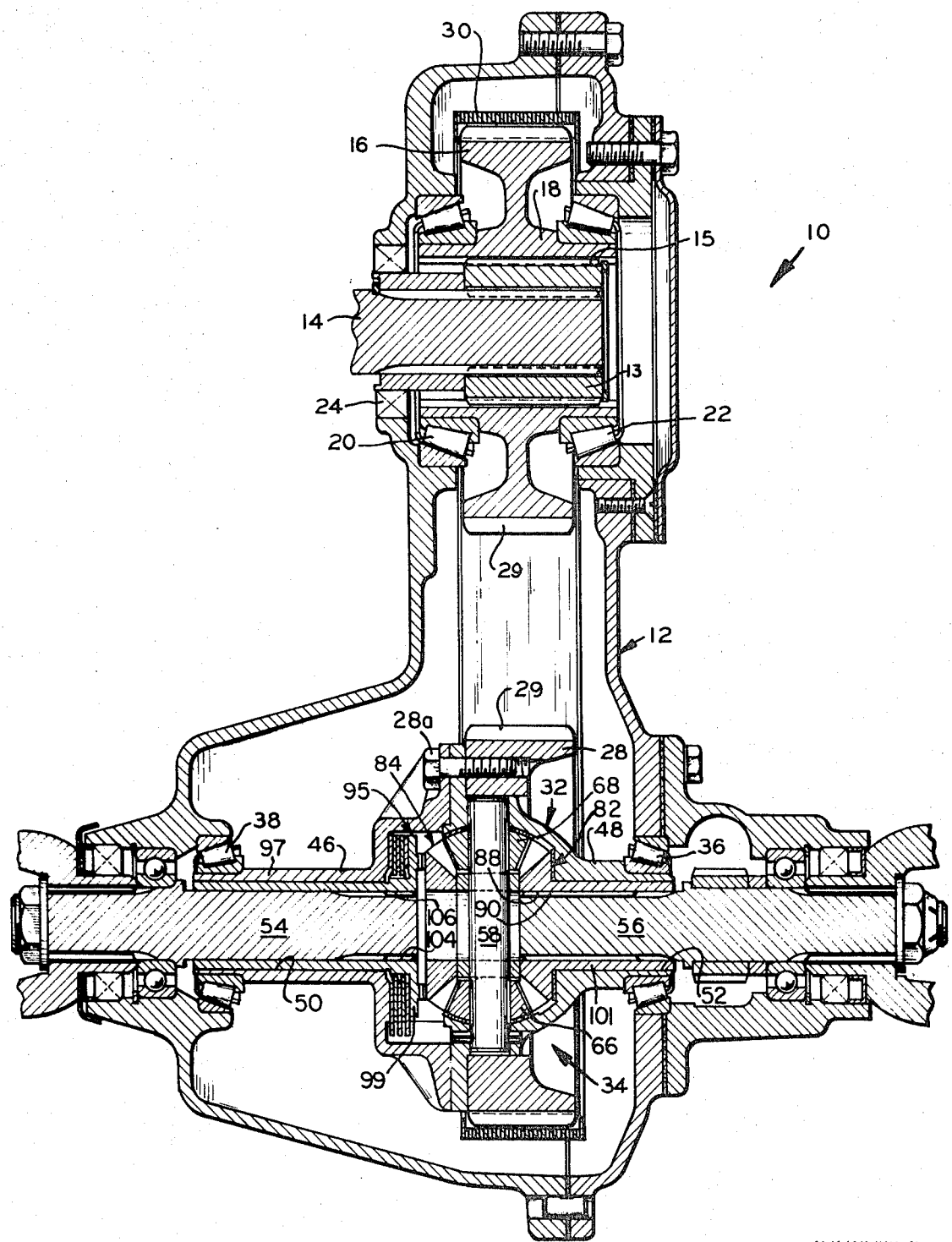
FIG. 1 is a sectional side view of the transfer case assembly showing the upper gear means and the differential disposed within the transfer case housing.

Referring now more specifically to the drawings, a transfer case assembly 10 is normally disposed intermediate the axles of a vehicle and is shown including a housing 12 which encompasses the operating parts of the transfer case assembly. An input shaft 14 is disposed within the upper portion of the housing 12 so as to be axially aligned with an output shaft of a transmission or a shift box (not shown) so as to provide a drive to the axles of the vehicle. A sleeve 13 is mounted on the input shaft 14 in a non-rotational relationship for supporting a gear means 16, with this gear means being connected to the sleeve 13 by splines 15. The gear means 16 includes an integral and axially extending hub 18 that projects in opposite directions from the main body portion of gear means 16 so as to provide a supporting arrangement so that the gear means 16 may be held in axial alignment by bearing means 20 and 22. These bearing means rotatably mount the gear means 16 and the shaft 14 so that they may be driven by the aforementioned output shaft of the vehicle. A sealing means 24, generally conventional in character, is disposed within the housing 12 adjacent the outwardly extending portion of the shaft 14 to seal the shaft and the housing 12 inwardly thereof from the intrusion of dirt and dust.

Spaced from, but in alignment with the gear means 16 is a ring gear 28. Means in the form of a chain 30 extend around the gear means 16 and the ring gear 28 to drivingly connect them by engaging with teeth 29 on the periphery of each. The ring gear 28 is conventionally mounted and fixed relative to a housing 32 of a differential 34 by means of bolts 28a. Differential 34 is rotatably mounted within housing 12 of transfer case assembly 10 by bearing means 36 and 38 that rotationally and pilotingly mount the said differential within the lower portion of the transfer case housing 12.

Figure 2:
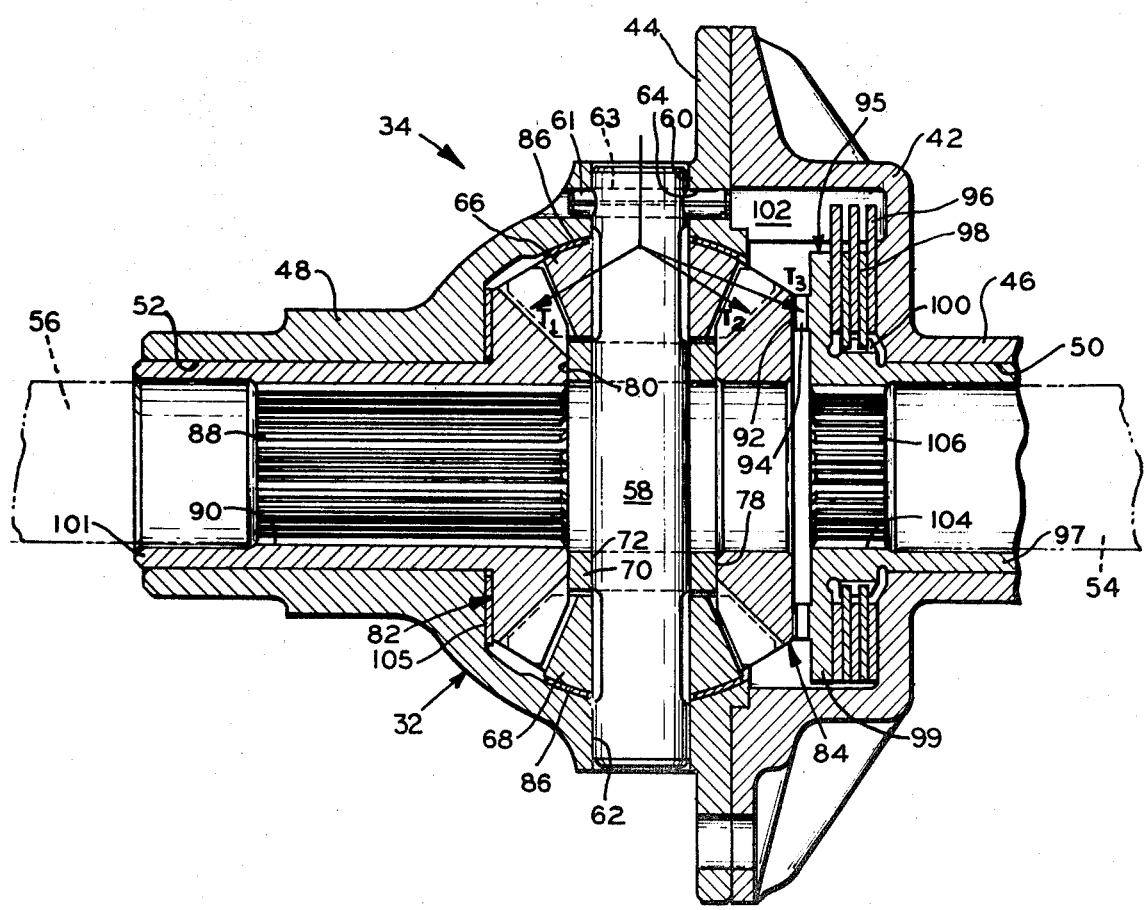
FIG. 2 is a partial sectional side view of the differential assembly taken from the obverse side.

More specifically, the differential housing 32 (FIG. 2) is comprised of two sections; a cap section 42 and a body section 44, with the body section 44 forming the major axial extent of the differential housing 32. Each of these sections include a hub portion extending outwardly therefrom for rotational mounting within one of the bearing means 36, 38, the cap section 42 including a hub portion 46 rotatably mounted within the bearing means 38 while the body section 44 includes a hub portion 48 rotatably mounted within the bearing means 36. The hub portions 46 and 48 are provided, respectively, with bores 50 and 52, through which a pair of coaxial output shafts 54 and 56 extend for connection to the rear and forward axles of the vehicle (not shown).

A coupling means is provided in the form of a cross pin 58 which extends transversely through the body section 44 of the differential 34 and is positioned therein by bores 60 and 62 formed so as to extend through the periphery of the body section 44. The pin 58 is non-rotatably mounted relative to the body section 44 by a locking pin 61 that extends parallel to the axis of the differential 34 so as to project transversely through the cross pin 58 by means of a bore 63 disposed therein. The locking pin 61 is positioned in the differential 34 by insertion into an axially extending bore 64 formed in the body section 44.

The cross pin 58 rotatably mounts thereon a pair of conventional pinion gears 66, 68, with these pinion gears spaced from each other by means of a spacer block member 70 having a bore 72 therethrough through which the pin 58 passes. The spacer block member 70 is of annular configuration and is disposed centrally on the pin 58 and is engaged by opposed inner faces 78, 80 on a pair of side gears 82 and 84. Additionally, spherical thrust washers 86, 86 are disposed between the spherical back faces of the pinion gears 66 and 68 and recessed surfaces provided in the body section 44 for absorbing the thrust loads therebetween.

The bevel side gears 82 and 84 are driven by the pinion gears 66, 68 with the bevel side gear 82 including a bore 90 with an internal spline 88 forming a non-rotational connection of this bevel gear to the shaft 56.

Clutch means is associated with the other bevel side gear 84 and is disposed in the differential housing 32 for clutching the other output shaft 54 to the housing 32 for rotation therewith. The clutch means comprises a plurality of clutch plates 96 and 98 and a clutch member 95. The clutch member 95 has a sleeve shaft portion 97 and a radially outwardly extending flange portion 99 at the inner thereof. The sleeve shaft portion 97 projects outwardly away from the flange portion 99 and is piloted in the bore 50 of the cap section 42. An externally splined portion 100 is provided on the sleeve shaft portion 97 adjacent the flange 99 for drivingly connecting the inner peripheral portions of clutch plates 98 while permitting the same to be axially slidable relative thereto. Alternate clutch plates 96 are drivingly connected to splines 102 provided on the interior of the cap section 42 and which also permit these plates to be axially slidable relative thereto.

From the above it can be seen that since the sleeve shaft portion 97 of the clutch member 95 is constructed in such a manner as to be capable of limited axial movement relative to the cap section 42 within the bore 50 of the cap section 42. Upon such movement the flange 99 is operable to move in a direction to urge the clutch plates 96 and 98 into frictional engagement with the internal adjacent face of the cap section 42 and thereby the differential case.

Means is associated with the bevel side gear 84 and the clutch means responsive to the transfer of torque through the differential to supplement the torque passing through the bevel side gear 84 to the second or other output shaft 54. The means used to accomplish this takes the form of a series of curvic clutch teeth 92 integral with the back face of the bevel side gear 84 and correspondingly shaped inter-meshing teeth 94 on the inner face of the outwardly extending flange 99 of the clutch member 95. The teeth 92 and 94 have positive pressure angles whereby the clutch plates 96 and 98 are urged into engagement by the separating forces generated by the teeth upon application of torque to the side gear 84. An explanation of the design of these clutch teeth may be found in U.S. Pat. No. 2,464,913, issued Mar. 22, 1949.

The clutch member 95 includes a bore 104 extending axially therethrough having internal splines 106 with these splines non-rotationally mounting the inner end of the output shaft 54. The internal assembly of the differential 34 is completed by the disposition of a bearing washer 105 between the side gear 82 and body section 44 to provide a bearing surface for the side gear 82 as it rotates relative to body section 44. The side gear 82 is bearingly received by a hub 101 disposed in the bore 52 provided in the hub portion 48 of the differential housing.

In operation the load is transmitted to the differential case through the chain means 30. This load is divided equally ($T_1$ and $T_2$) at each bevel side gear 82 and 84. One side gear 82 is connected directly to the front axle 56 while the other side gear 84 is connected to the clutch member 95 by the face type curvic clutch teeth 92 and 94 having a pressure angle. As the torque is transmitted through the curvic clutch teeth 92 and 94 these teeth tend to generate a force ($T_3$) which is applied to clutch plates 96 and 98 connected to the driving or output shaft 54 and the differential case. By this arrangement the torque transmitted from the output shaft 54 to the rear driving axle will be equal to the torque transmitted from the output shaft 56 to the front axle plus the torque capacity into the clutch means. Accordingly, the torque normally passing through the side gear 84 to the second or other output shaft 54 is supplemented by the torque passing directly from the differential case through the clutch means to the output shaft.

By changing the pressure angle of the curvic teeth or the number of plates in the clutch stack, any desired torque capacity can be designed into the unit.

It should be clear from the foregoing description that a transfer case assembly having an inter-axle differential has been provided which divides the torque unevenly so that the axle requiring the larger torque force is able to receive it. Thus, a differential has been described which fulfills the objects of the invention and has all the attendant advantages thereof. However, it is to be understood that the specific construction described is only exemplary and that other obvious alternatives for fulfilling the same functions as are disclosed in the instant inter-axle differential will obviously occur to one skilled in the art.

What is claimed is:

1. A transfer case assembly comprising; (a) a transfer case housing, (b) an input shaft disposed in said housing and adapted for rotative movement with respect thereto, (c) a differential case in said housing having a ring gear disposed thereon, (d) means in said transfer case housing drivingly interconnecting said input shaft and said differential ring gear for rotation in unison, (e) pin means, a pair of pinion gears, and a pair of side gears disposed in said differential housing with said pinion gears each being rotatable on said pin means and each of said side pinion gears meshing with both of said side gears, (f) a first output shaft rotatably mounted in said transfer case housing and connected to one of said side gears for rotation therewith, (g) a second output shaft rotatably mounted in said transfer case housing, (h) clutch means disposed in said differential case and adapted to clutch said second output shaft to the differential case for rotation therewith, (i) means associated with the other of said side gear and said clutch means and responsive to the transfer of torque through said differential to urge said clutch means into engagement whereby the torque normally passing through said other side gear to said second output shaft is supplemented by the torque passing directly from the differential case through the clutch to said output shaft.

2. The transfer case assembly of claim 1 wherein said clutch means comprises a plurality of clutch plates, some of which are drivingly connected to said differential housing and some of which are drivingly connected to said one output shaft.

3. The transfer case assembly of claim 2 wherein said torque responsive means comprises inter-meshing positive pressure angle teeth disposed on said clutch means and the back face of said one side gear whereby the clutch plates are urged into engagement by the separating forces generated by said positive pressure angle teeth upon the application of torque to said side gears.

4. The transfer case assembly as described in claim 3 wherein one element of said clutch means includes a sleeve shaft on said second output shaft and having the inner end thereof flanged outwardly with the positive pressure angle teeth of said clutch means being disposed on the inner face thereof and the remainder of said clutch means being disposed between said flange and said differential case.

5. The combination set forth in claim 4 wherein said means drivingly interconnecting the input shaft with said differential ring gear is a gear disposed on said input shaft and a chain interconnecting said gear with said differential ring gear.

References Cited
UNITED STATES PATENTS

| | | | |
|---|---|---|---|
| 956,143 | 4/1910 | McGill | 74—710.5 |
| 2,203,282 | 6/1940 | Keese | 74—711 |
| 2,228,581 | 1/1941 | Olen | 74—711 |
| 2,768,538 | 10/1956 | Simonds | 74—711 |
| 3,055,234 | 9/1962 | O'Brien | 74—711 |
| 3,264,901 | 8/1966 | Ferbitz et al. | 74—711 |

CORNELIUS. J. HUSAR, Primary Examiner